(12) United States Patent  (10) Patent No.: US 9,083,839 B2
deFremery et al.  (45) Date of Patent: Jul. 14, 2015

(54) IMAGING DEVICE

(71) Applicants: Peter Wayne deFremery, Seoul (KR);
John Newton Young, Fairfax, CA (US)

(72) Inventors: Peter Wayne deFremery, Seoul (KR);
John Newton Young, Fairfax, CA (US)

(*) Notice: Subject to any disclaimer, the term of this patent is extended or adjusted under 35 U.S.C. 154(b) by 64 days.

(21) Appl. No.: 13/742,133

(22) Filed: Jan. 15, 2013

(65) Prior Publication Data
US 2014/0198353 A1 Jul. 17, 2014

(51) Int. Cl.
H04N 1/024 (2006.01)
H04N 1/04 (2006.01)
H04N 1/028 (2006.01)
H04N 1/195 (2006.01)

(52) U.S. Cl.
CPC ....... *H04N 1/02815* (2013.01); *H04N 1/02805* (2013.01); *H04N 1/195* (2013.01); *H04N 2201/0434* (2013.01)

(58) Field of Classification Search
CPC ............. H04N 1/107; H04N 2201/00852; H04N 2201/1077; H04N 1/193; H04N 2201/0471; H04N 1/1017; H04N 1/1013; H04N 1/12; H04N 2201/00849

USPC ......... 358/474, 471, 475, 482, 483, 505, 509, 358/512–514, 473; 250/208.1; 382/312, 382/313
See application file for complete search history.

(56) References Cited

U.S. PATENT DOCUMENTS

| 5,377,022 | A * | 12/1994 | Street et al. ............... 358/498 |
| 7,548,351 | B2 * | 6/2009 | Imai et al. ............... 358/474 |
| 7,787,161 | B2 * | 8/2010 | Oyama ............... 358/498 |
| 8,020,861 | B2 * | 9/2011 | Itabashi et al. ........ 271/258.01 |
| 8,020,862 | B2 * | 9/2011 | Oyama et al. ......... 271/265.01 |
| 8,172,226 | B2 * | 5/2012 | Murakami et al. ......... 271/264 |
| 2002/0009238 | A1 * | 1/2002 | Bird ............... 382/312 |
| 2005/0179964 | A1 * | 8/2005 | Izumi ............... 358/483 |

* cited by examiner

*Primary Examiner* — Cheukfan Lee
(74) *Attorney, Agent, or Firm* — Steven A. Nielsen; www.NielsenPatents.com

(57) ABSTRACT

An imaging device comprising a flexible sensor attached to a control case. The flexible sensor provides both a source of illumination to the image being captured and a method of capturing the image. The method of capture comprises a field of reactors disbursed across the facial area of the sensor, the output of which produces a dot-pattern capture of the intended image which is passed to a storage device.

9 Claims, 9 Drawing Sheets

IMAGING DEVICE

CROSS-REFERENCE TO RELATED APPLICATIONS

The following references are considered to be relative prior art.
Provisional 61,545,557
U.S. Pat. No. 8,344,432
U.S. Pat. No. 8,344,306
U.S. Pat. No. 8,343,793
U.S. Pat. No. 8,228,571
U.S. Pat. No. 8,199,382
U.S. Pat. No. 8,014,044
U.S. Pat. No. 7,884,974

STATEMENT REGARDING FEDERALLY SPONSORED RESEARCH OR DEVELOPMENT

Not applicable

REFERENCE TO SEQUENCE LISTING, TABLE, OR DISK APPENDIX

Not applicable

BACKGROUND OF THE INVENTION

There are known methods of capturing, manipulating and displaying printed images; standard office copying machines are well known. Existing methods of image capture, manipulation and display, typically require rigid, cumbersome hardware that includes a dedicated operational platform with moving parts and large energy consumption.

Further, the known methods of capturing undistorted images of bound material such as books or manuscripts require that the books be opened fully so that the pages may be flattened to remove image distortion as referenced to the imaging surface of the capture device. These opening and flattening requirements are destructive to books' bindings. Further, they force page exposure to the destructive effect of strong light and environmental pollutants; these considerations are particularly critical when trying to copy old or rare books or manuscripts.

PURPOSE OF THE INVENTION

It is a purpose of this invention to provide an imaging device that may be portable and which allows image capture, manipulation and display in a device with low energy requirements, no moving parts, a scalable architecture, and allowance for a thin, flexible working surface to permit accurate imaging of curved surfaces within limited spaces such as images with access problems or as between the pages of a book or a scroll or a manuscript.

It is a further purpose that this imaging device to use low levels of illumination to capture images, so as to reduce both power requirements of the imaging device and the destructive effects of intense illumination upon the images being captured.

BRIEF DESCRIPTION OF THE DRAWINGS

FIG. 7b is a cross section view of the components of FIG. 7a.

DETAILED DESCRIPTION OF THE INVENTION

Typical document imaging devices are either large, bulky devices such as office copying machines, or small, low resolution, hand-held devices that are difficult to accurately control and align over the image, and that require that images be held very flat and stable as they are scanned. Most all existing document imagers are based on the principle of scanning the document, that is the image is captured section by section as a recording device is mechanically or optically pulled, or scanned over the image.

Cameras can be used to capture document pages without scanning, but have obvious problems of position, alignment, parallax, lens distortion of flat images and more—especially when multiple documents are to be scanned and there needs to be accurate justification or alignment between document pages as in copying multiple pages of a book or manuscript.

Adequate illumination is also a problem for most camera imaging. It is not a problem for office copiers, but they use large amounts of energy to produce high levels of illumination that can damage delicate documents as they are captured. Curvature of document pages, in particular bound documents, as they are copied is problematic for all methods of document image capture.

Figure 1:
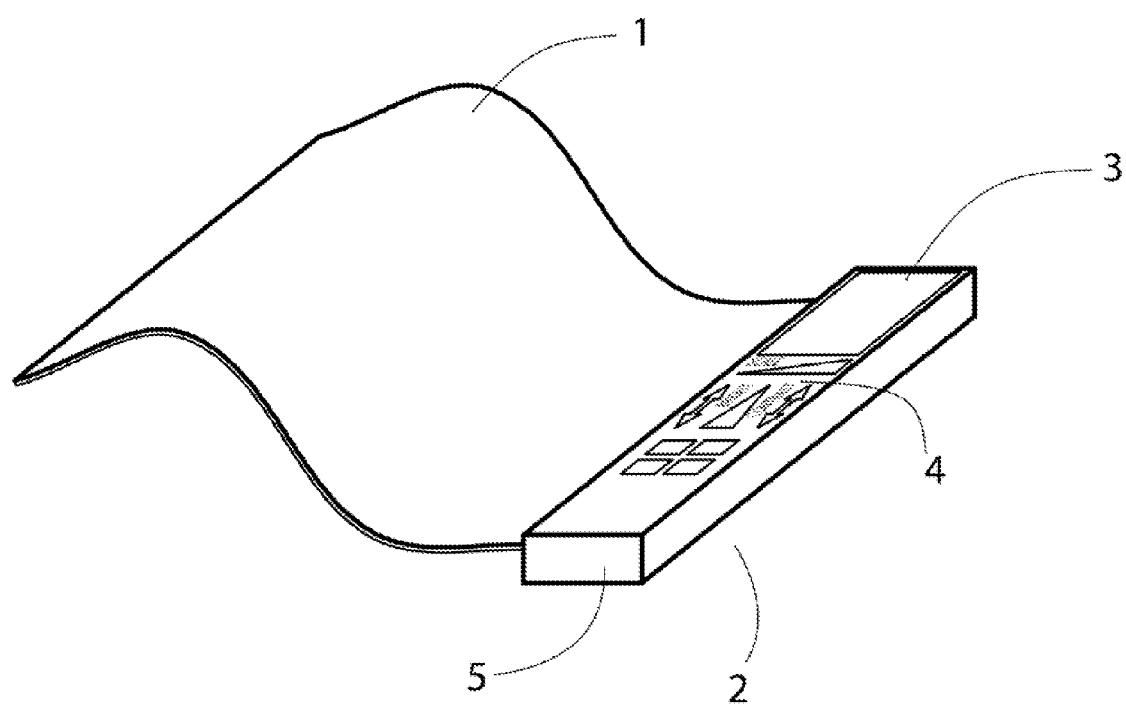
FIG. 1 is an overview image of the full device indicating the main component parts.

The device of FIG. 1 shows a scanning system that solves the problems listed above. In its most basic form, the device consists of a thin, flexible sensor 1 attached to a control case 2. The flexible sensor can either be laid over and held face to face with a document or artifact to capture its image, or slipped between the pages of a book, manuscript or the like, conforming to the curve of a pages to capture the pages' images. While not required, the control case may include a graphic display 3 of the captured image and a control panel 4 with various controls to capture and manipulate the image. The device may be either plug-in or battery powered 5.

The flexible sensor provides both a source of illumination to the image being captured and a method of capturing said image. Said method of capture comprises a field of reactors disbursed across the facial area of sensor, the output of which produce a dot-pattern capture of the intended image which is passed to some manner of storage device. It is known that the density of the said field of reactors will control the fidelity of the image capture. The thickness and flexibility of the sensor is controlled by both the characteristics of the materials used for its various layers and the thickness of these different materials. If so desired, it is anticipated that the sensor unit total thickness might be less than 3 mm.

Figure 2:
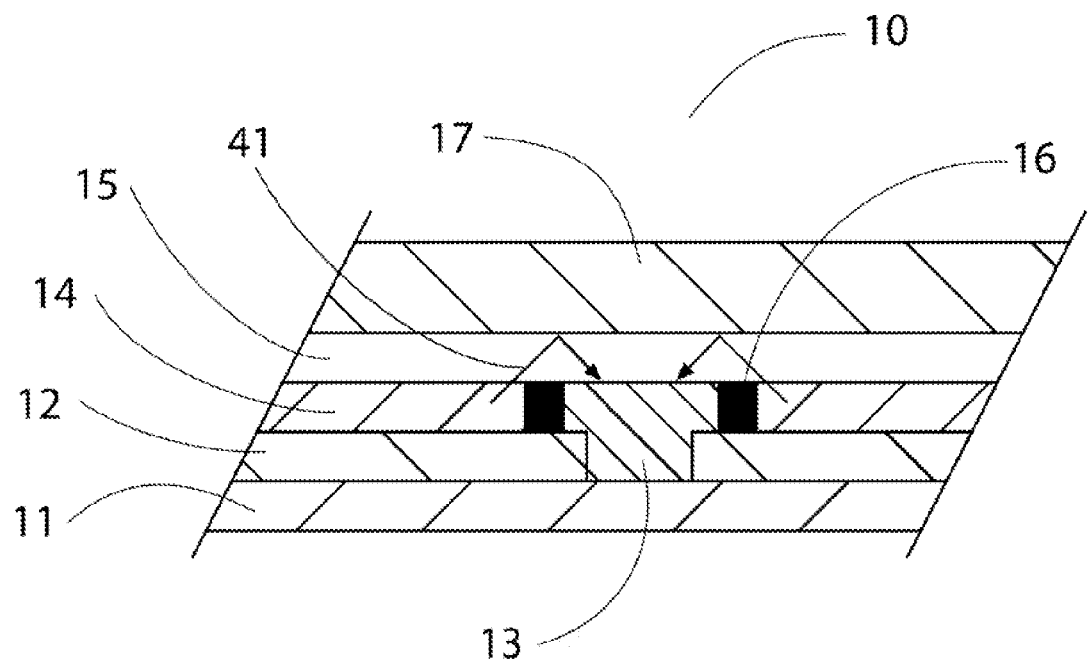
FIG. 2 is a cross sectional view of the flexible sensor revealing its component parts.

FIG. 2 is a cross section of the sensor through a reactor segment. Layer 11 is a protective coating for conductors 12, and the conductors are in contact with reactors 13. The reactors are positioned within light shields 16 in the light channel 14 so as to optically isolate the edges and bottom of the reactors from the illumination within the light channel. Atop both the illumination channel and the reactors, window layer 15 provides space for light 41 to travel from the illumination channel to the image and reflect back onto the tops of the reactors.

Each reactor has at least two conductors 23, 24 in contact therewith, with a gap 22 between them across the reactor to transmit signal changes in reactor output. Reactors are made of materials that react to illumination. For most document image capture, the illumination used and reactor properties would be matched to the frequencies of conventional light, but it is fully anticipated that for other image capture or forensic purposes, alternate illumination frequencies and reactor properties might be preferable.

From the areas between the shielded reactors, the light channel provides illumination to the image being recorded, and the material of the reactors responds to the amount of reflected radiance from the image in greater or lesser degree as controlled by the amount of reflected illumination striking the reactors. As is known, where the image is white or otherwise reflective, a substantial percentage of the illumination will be reflected back onto the surface of the reactor, and the reactor will give a strong signal. Where the image is dark or otherwise less reflective, less light is reflected and the reactor will give a weak signal.

For the purposes of this device, the reactors comprise any materials that may affix to the sensor and which react to illumination in some known manner that may be sensed and recorded. Several possibilities exist. For example, illumination might cause reactors of one material to form a voltage potential which would be sensed by their conductors and passed back to a processing module. Alternately, the reactors could be of a different material which changes its resistance when illuminated; this change in resistance could be sensed and recorded. In both these examples a range of reflected illumination on the reactors provides a range of readings so that the device would have the option to record shades of reflected illumination if so designed within the recording electronics of the imaging device.

Figure 3:
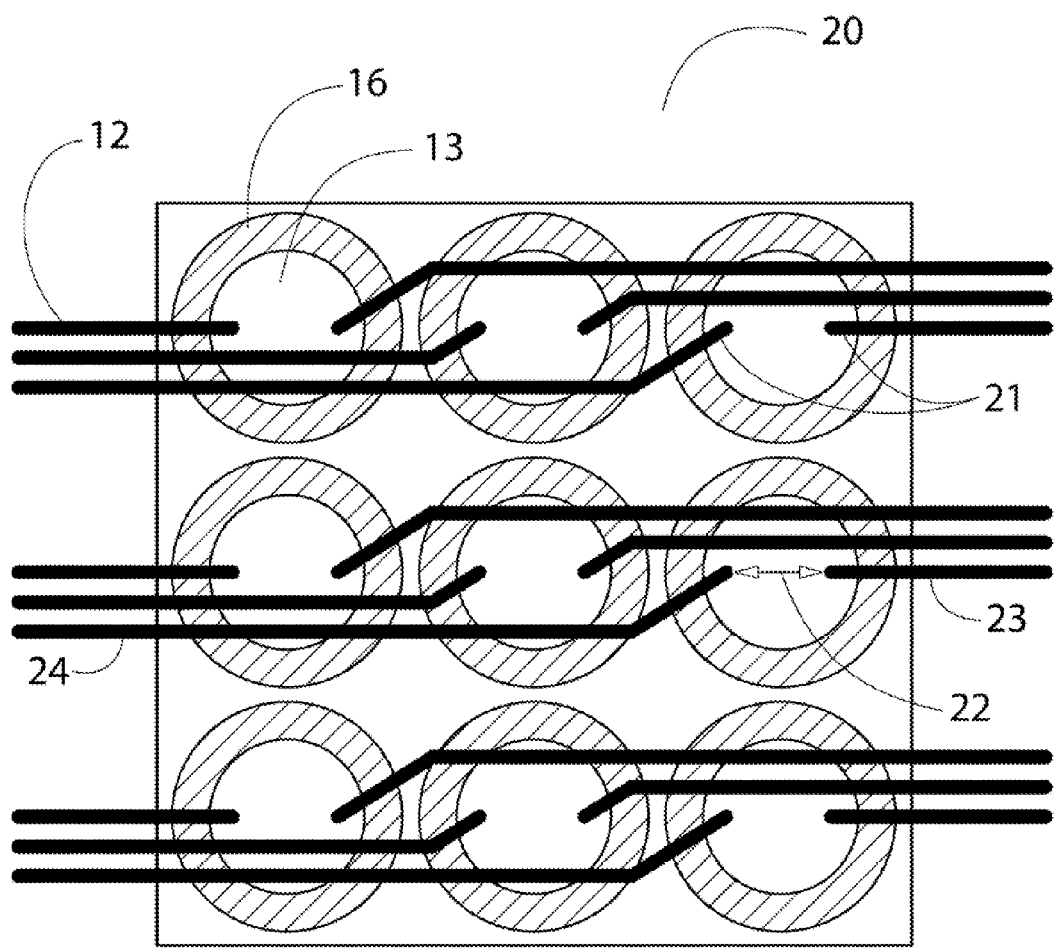
FIG. 3 is a surface-view representational portion of the sensor reactor field
Figure 4:
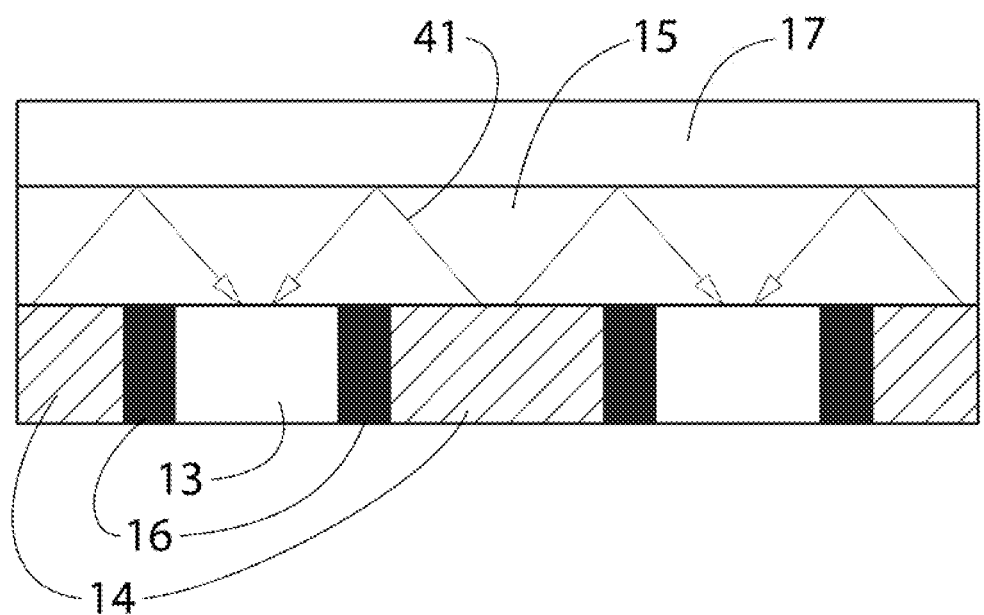
FIG. 4 is a cross sectional view of a portion of the sensor showing details of the sensor function.
Figure 5:
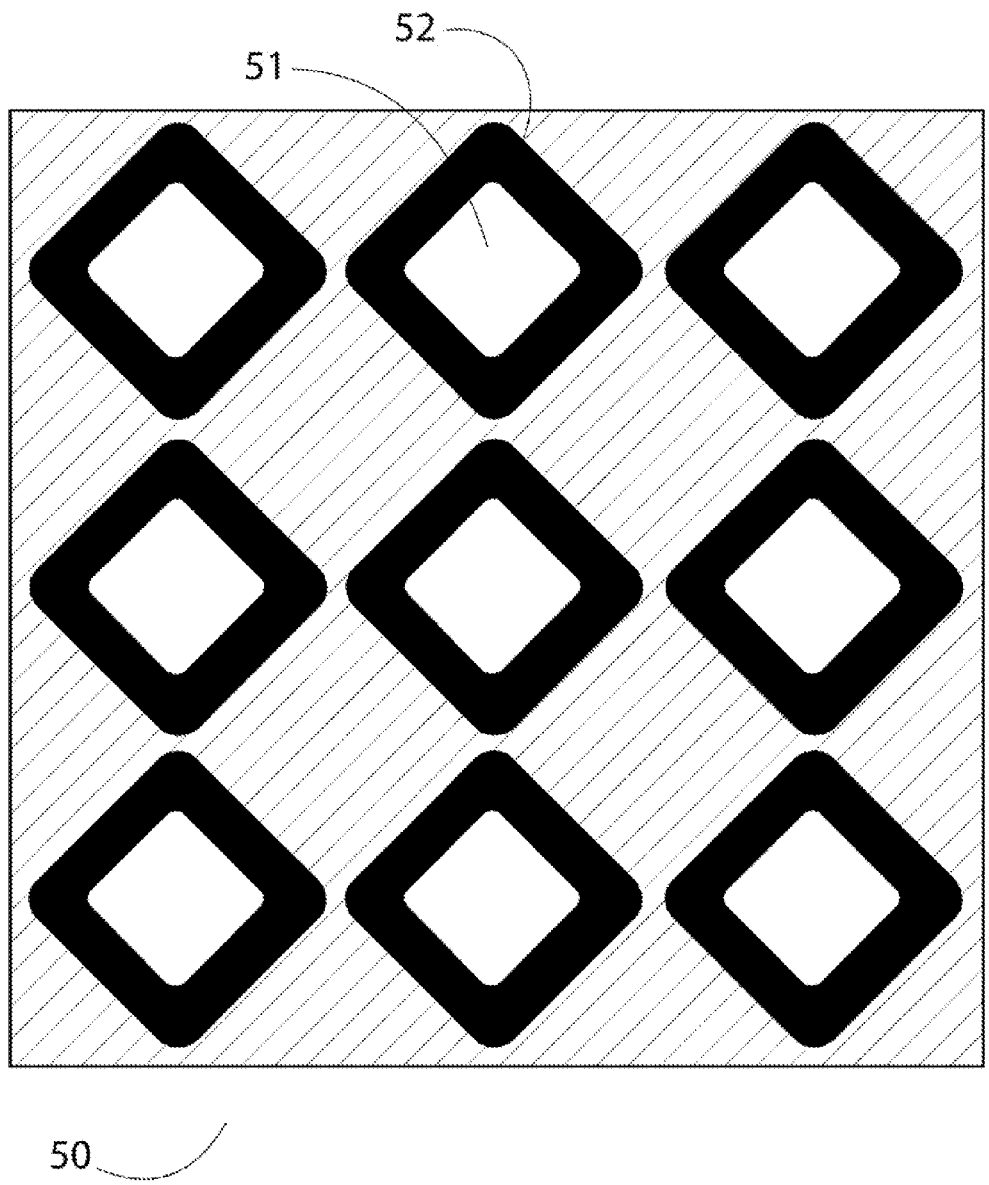
FIG. 5 illustrates an alternate shape of the reactors and their related shields.

It is understood that differently shaped, shielded reactors may affect the function of the sensor. While FIG. 3 shows circular shielded reactors, FIG. 5 shows diamond shaped reactors and shields 51 and 52 that provide increased illumination surface on the illumination channel and reduced reactor surface area. It is not a purpose of this invention to determine the exact shape of the shielded reactors. Reactor shapes illustrated are for reference only. Optimal design of the shielded reactors may be determined by the specific purpose for which the device will be used, as well as the chosen reactor material and illumination source.

Above describes an imager device that captures a single image surface or face. The principles described can be easily translated to permit bi-directional imaging. A bidirectional imager would allow insertion of the sensor between two facing images in close proximity, such as between the pages of a book, between the layers of a scroll or between any other facing images, and the capture of both facing images at the same time or in rapid succession depending on the program instructions of the control circuitry. The resultant two said captured images would be as well registered, or aligned, with each other as were the pages in the book or manuscript when the capture was made.

Figure 6:
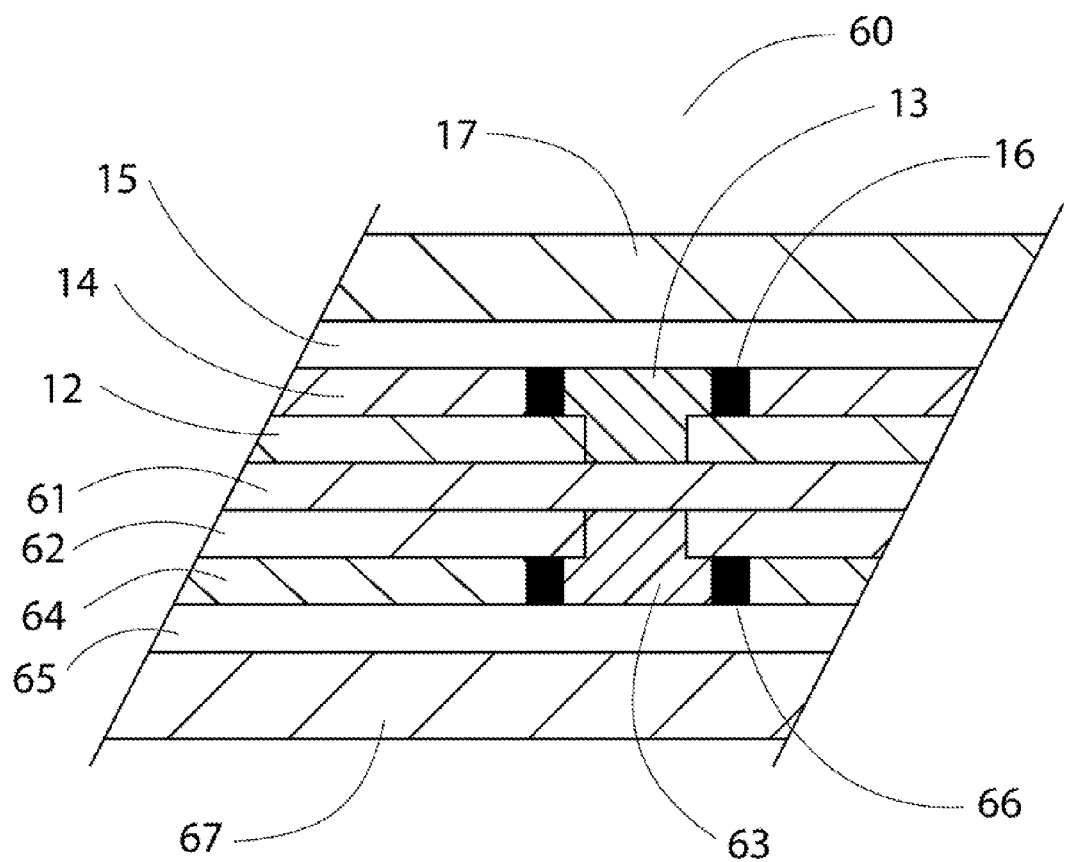
FIG. 6 is a cross section, portion view of a sensor with the sensor of FIG. 2 mirrored to illustrating bi-directional imaging capability.
Figure 7A:
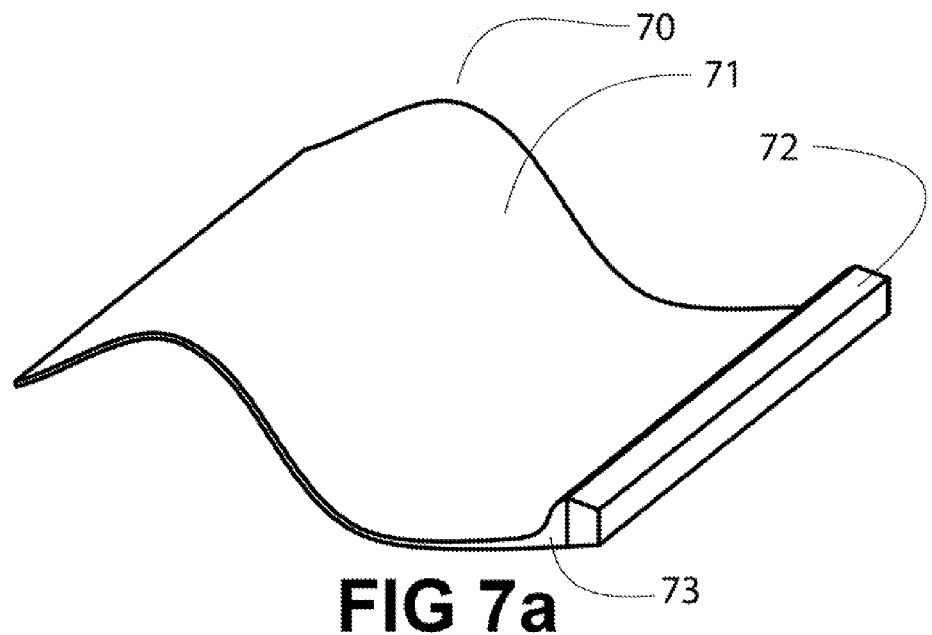
FIG. 7a is a perspective view of the flexible illumination channel together with its illumination module.
Figure 7B:
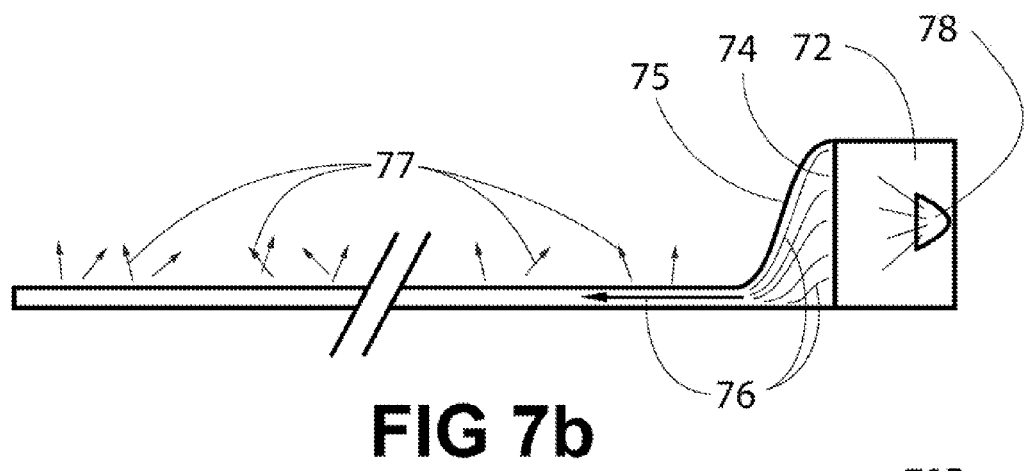
Figure 7C:
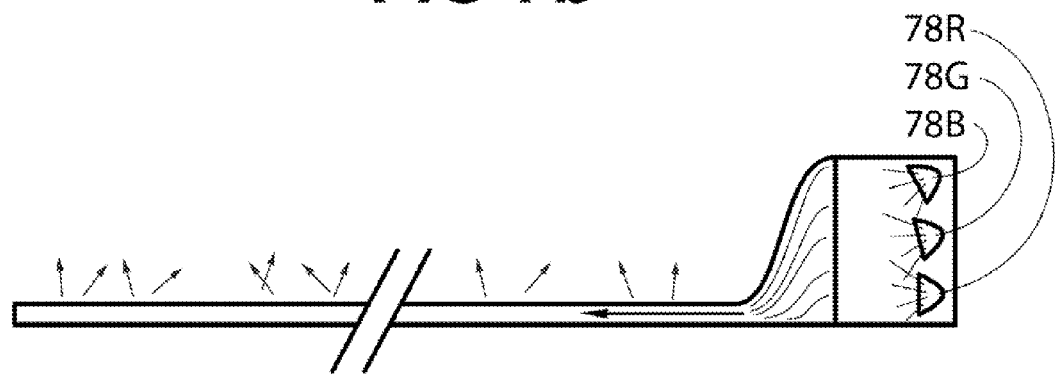
FIG. 7c is the same cross section of FIG. 7b showing an alternate illumination option.
Figure 8:
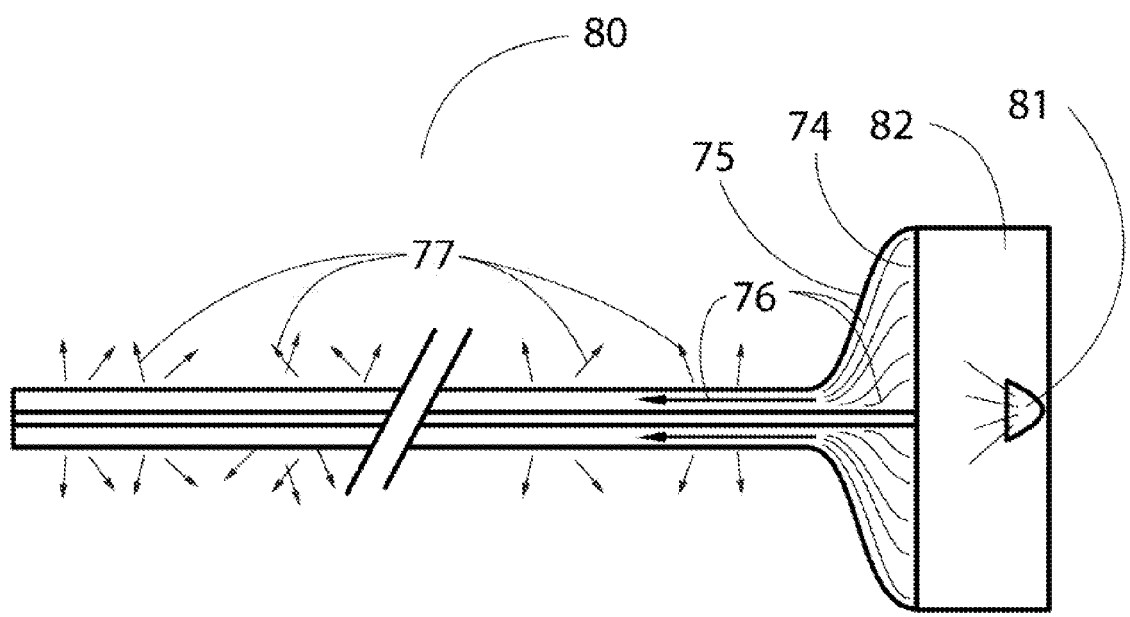
FIG. 8 is a cross section view of a bi-directional illumination channel with a shared illumination module.

By mirroring the flexible sensor assembly so far described, a bi-directional imaging device 60 is possible as shown in FIG. 6. The image to be captured 17 remains as before. We may say that 17 is one of the two pages between which the sensor is inserted; image 67 would be the facing page. Capturing image 17 is as already described. Capturing image 67 is similar and uses illumination channel 64 to provide the illumination which passes through window 65 and reflects off image 67 and onto reactor 63 inside optical shield 66. Conductor protection 61 is common to both directions of capture. The response of reactors 63 to illumination is transmitted by conductors 62 to the recording electronics in the control case.

Critical to the function of the imager is the illumination channel and its attached illumination module 72. The illumination channel is a flexible sheet of material that captures radiance at its edges, distributes that light 76 throughout the sheet, and retransmits the light out of the sheet 77 evenly across its face surface. This principle is well known and practiced, and most commonly understood in the form of fiber optics. As used in this imager, and for the purposes of clear understanding, it would be accurate to change the term 'fiber optics' as used in other devices to 'page optics' or 'sheet optics' as used in this application. An illumination source 78 inside the illumination module 72 is directed at one edge 74 of said illumination channel, and the other edges of the illumination channel are preferably silvered or otherwise shielded to keep a maximum amount of illumination trapped within the sheet's perimeter. Since the illumination channel is preferably very thin, in order to get more illumination into the light channel's interior, the edge being illuminated may be flared 75 to give an increased edge surface and subsequent greater radiance capture.

The illumination source 78 is preferably a low-power, high-illumination device such as an LED or similar device, and may be a single frequency source to give only a single-color gray-shade capture, or may be a multiple frequency source to allow substantially increased capture information. A possible document scanning method to capture color would be to provide a red source 78R, a green source 78G and a blue source 78B so that 3 sequential scans—each made with one or the other of these illumination sources, could be made of any image to capture the color content of said image. An single illumination source that could have its radiance characteristics changed or otherwise controlled would also serve this purpose. As previously described, different light sources and reactor responses may be used to achieve particular imaging goals. In most existing imagers, a single-color illumination source is used—usually white light, and different sensor characteristics are provided to separate the different color characteristics of the reflected image. Camera sensors, as a rule, only react to levels of light and dark, and usually an array of sensors has portions of the sensors filtered in various was to determine the color information of an image. In the imager of this application, the response of the reactors remains uniform, and it is the illuminating light source that is changed to give different reactor responses for different illumination characteristics.

In a well designed bidirectional imager, it is fully anticipated that with proper design and placement of reactors, shields and conductors, that illumination channels 14 and 64 may be the same component. Light may emanate equally from both faces of the illumination channel, and there is no inherent need to have separate illumination channels in a bidirectional imager. It is only for clarity of explanation that they have been illustrated and described as separate components.

The illumination channel of bi-directional sensor 80 utilizes a second, mirror image of the illumination channel as previously described. Illumination module 81 may contain a single shared illumination source 81 or multiple illumination sources as previously described, or have different light and reactor characteristics in each imaging direction.

Figure 9:
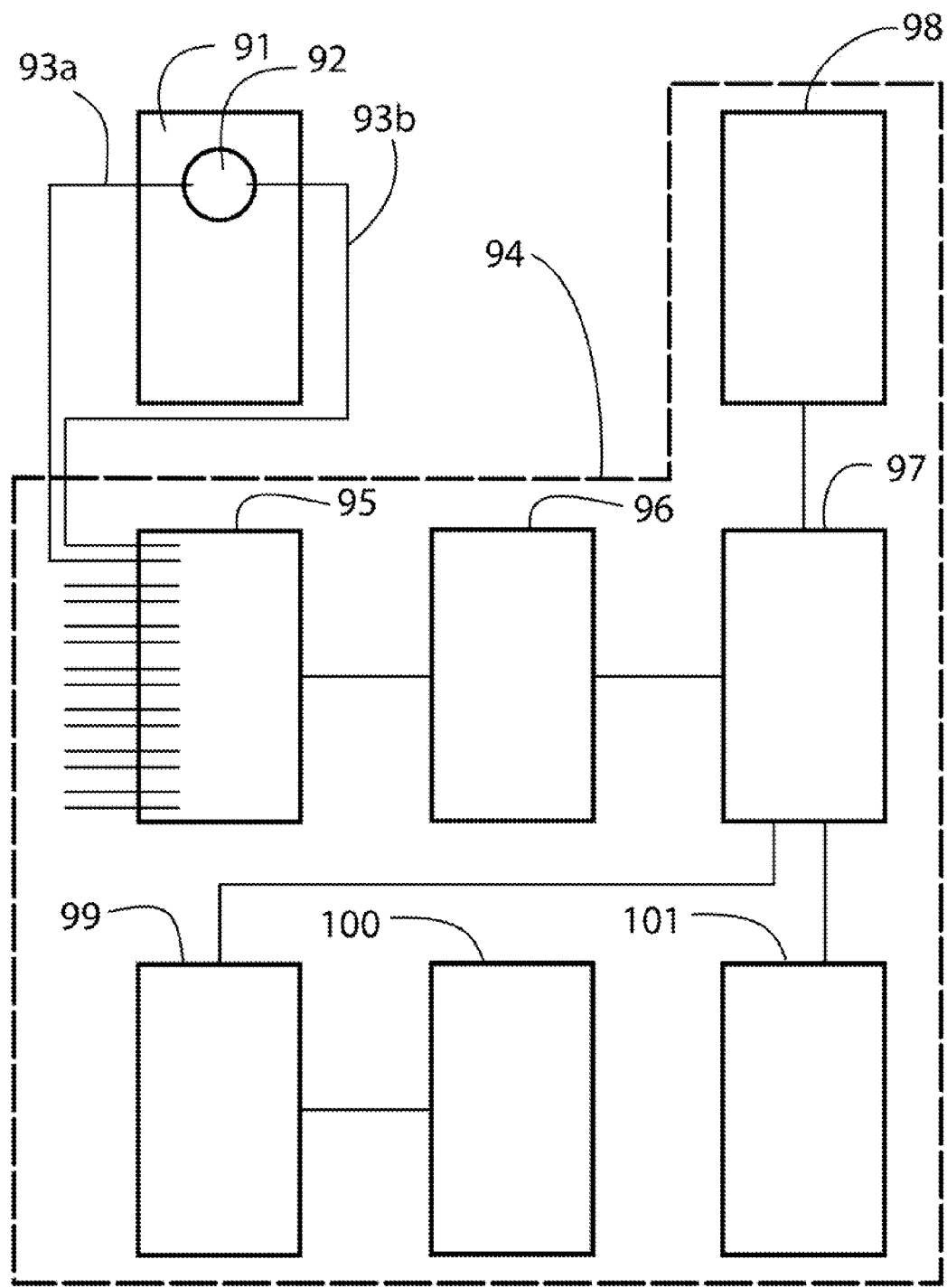
FIG. 9 is a logic sketch illustrating possible control functions of the device.

Operational logic of the device is illustrated in FIG. 9. When the illumination source is turned on, light is passed through the illumination channel as previously described, and all reactors 92 are affected at the same time and for the same duration by the illumination emanating from the light channel. Each reactor has its own conductor paths 93a, 93b leading to sequence module 95. The sequence module scans the inputs from every reactor in a predetermined order and passes the sequenced information to the mapping unit 96 to store the inputs as a dot pattern or pixel map. The mapping unit functions primarily as a memory device that maps each reactor's reading to a corresponding address in the mapping unit's memory. It is understood and anticipated that all the reactors could also be wired more directly to there respective location in the mapping unit. Imaging electronics is well known and many standards already exist. We are making no claims about the electronic details of storing or manipulating the image after capture.

While we make no claim on the storage or manipulation electronics, it is important to understand that the capture of the image can be stored and utilized. The following is one possible logic flow for captured image pixels.

The mapping unit 96 holds an unaltered map of the reactor readings as the raw map, and passes a copy of the map to memory unit 97. The memory unit's image of the map may be adjusted and manipulated by the controls of image controller 98. The image controller could make adjustments such as brightness, contrast and other image manipulations. It is anticipated that information external to the device could be brought in through the controller, through conventional ports, so that external information could be mixed or superimposed over the map to make complex composite images.

The manipulated map of the memory unit is passed both to standard output device 101 and to video display 99. The video display is controlled by video control 100, which may include controls such as brightness or image magnification.

The sensor unit is preferably flexible, durable and thin. It is anticipated that know methods may be used to assemble the layers of the sensor, most likely utilizing polymer sheets, and known printing, deposition or etching processes.

What is claimed is:

1. A simple image capture device with no moving parts, very low energy requirements and low intensity image illumination requirements, comprising:
   a. a sensor linked to a control case, wherein the sensor provides illumination to, and capture of, an image and;
   b. wherein the sensor comprises:
      i. a dispersed field of reactor elements optically shielded from an illumination source in all directions except that facing the image to be captured, wherein the reactor elements are configured to measurably respond to different levels of illumination;
      ii. an illumination channel that evenly transmits illumination from its face surfaces;
      iii. a plurality of light shields located longitudinally along the illumination channel, with the light shields and the illumination channel arranged along the same plane that includes the plurality of light shields;
      iv. conductors to transmit reactor responses to an external storage device; and
      v. a window layer providing a medium through which illumination passes, to the image and, when reflected, back onto the reactor elements.

2. The image capture device of claim 1 in which the sensor form a single, thin, flexible sheet.

3. The image capture device of claim 1 in which the image is captured without the need of a conventional scan of the image.

4. The image capture device of claim 1 in which the source of illumination is variable to capture different reflective aspects of an image.

5. An image capture device comprising:
   a. a sensor linked to a control case, therein the sensor provides illumination to, and capture of, an image;
   b. wherein the sensor comprises:
      i. a dispersed field of reactor elements optically shielded from an illumination source in all directions except that facing the image to be captured, wherein the reactor elements are configured to measurably respond to different levels of illumination;
   c. two illumination channels, each having a plurality of optical light shields located longitudinally along the illumination channels, with the light shields and the light shields' corresponding illumination channel arranged along the same plane that includes the plurality of light shields;
   d. a first dispersed field of reactor elements, and a second dispersed field of reactor elements, both optically shielded from the two illumination channels in all directions except that facing the image to be captured;
   e. a first set of conductors, and a second set of conductors configured to transmit reactor responses to an external storage device; and
   f. a first window layer and a second window layer, both providing a medium through which illumination passes to first and second images and reflect back onto the first and second field of reactor elements.

6. The image capture device of claim 5 in which the sensor arrangement for capturing the first opposing image and a second opposing image forms a single thin, flexible sheet.

7. The image capture of claim 5 in which the image is captured without the need of a conventional scan of the image.

8. The image capture device of claim 5 in which the illumination channel provides illumination to the first opposing image and a second opposing images.

9. The image capture device of claim 5 in which the first set of conductors and the second set of conductors transmit different reactor responses to the external storage device.

* * * * *